US012523241B2

(12) United States Patent
Ohira et al.

(10) Patent No.: US 12,523,241 B2
(45) Date of Patent: Jan. 13, 2026

(54) HYDRAULIC DRIVE DEVICE

(71) Applicant: KAWASAKI JUKOGYO KABUSHIKI KAISHA, Kobe (JP)

(72) Inventors: Masahiro Ohira, Kobe (JP); Ryo Kawakami, Kobe (JP); Koji Yamasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/715,256

(22) PCT Filed: Aug. 9, 2022

(86) PCT No.: PCT/JP2022/030502

§ 371 (c)(1),
(2) Date: Nov. 12, 2024

(87) PCT Pub. No.: WO2023/105855

PCT Pub. Date: Jun. 15, 2023

(65) Prior Publication Data

US 2025/0198428 A1 Jun. 19, 2025

(30) Foreign Application Priority Data

Dec. 7, 2021 (JP) ................................. 2021-198862

(51) Int. Cl.
*F15B 11/05* (2006.01)
*F15B 11/02* (2006.01)

(52) U.S. Cl.
CPC .............. *F15B 11/05* (2013.01); *F15B 11/02* (2013.01)

(58) Field of Classification Search
CPC .. F15B 11/05; F15B 11/02; F15B 2211/30535
See application file for complete search history.

(56) References Cited

U.S. PATENT DOCUMENTS 3,987,704 A * 10/1976 Johnson .............. F15B 13/0402 91/461
2018/0127949 A1* 5/2018 Nakajima ............. E02F 9/2239

FOREIGN PATENT DOCUMENTS

JP H03260401 A 11/1991
JP 2021156355 A 10/2021

* cited by examiner

*Primary Examiner* — Abiy Teka
(74) *Attorney, Agent, or Firm* — Alleman Hall & Tuttle LLP

(57) ABSTRACT

A hydraulic drive device drives at least first to third hydraulic devices by supplying a working fluid to the hydraulic devices. The hydraulic drive device includes at least first and second pumps respectively connected to the first and second hydraulic devices, a merge passage that is connected to the pumps and in which streams of the working fluid discharged from the pumps join together, a flow rate control valve that is connected to the merge passage and the third hydraulic device and controls the flow rate of the working fluid flowing from the merge passage to the third hydraulic device by adjusting an opening degree thereof according to a control signal, and a pressure compensation valve that is provided on a third hydraulic device side relative to a merge point at which the streams join together and maintains a pressure difference of the control valve at a predetermined pressure.

2 Claims, 4 Drawing Sheets

HYDRAULIC DRIVE DEVICE

TECHNICAL FIELD

The present invention relates to a hydraulic drive device that drives a plurality of hydraulic devices by supplying a working fluid to each of the plurality of hydraulic devices.

BACKGROUND ART

There are known hydraulic drive devices that each drive a plurality of hydraulic devices such as a cylinder and a motor using a single pump. Examples of such hydraulic drive devices include the hydraulic drive device disclosed in Patent Literature (PTL) 1. In the hydraulic drive device disclosed in PTL 1, a directional control valve and a pressure compensation valve are provided for each hydraulic device. Therefore, with the hydraulic drive device, a pressure oil is allowed to flow to each hydraulic device at a flow rate corresponding to the opening degree of a flow rate control valve regardless of a load on the hydraulic device.

CITATION LIST

Patent Literature

PTL 1: Japanese Laid-Open Patent Application Publication No. 2021-156355

SUMMARY OF INVENTION

Technical Problem

In the hydraulic drive device disclosed in PTL 1 which drives a plurality of hydraulic devices using a single pump, the following problem occurs. Specifically, at the time of driving two hydraulic devices at the same time, the discharge flow rate of the pump may be insufficient for a total flow rate required for the hydraulic devices. In this case, the pressure oil is supplied to the hydraulic device with a greater load at a particularly insufficient flow rate.

In view of this, an object of the present invention is to provide a hydraulic drive device that, at the time of driving two hydraulic devices at the same time, can prevent each of the hydraulic devices from being supplied with a working fluid at an insufficient flow rate.

Solution to Problem

A hydraulic drive device according to the present invention drives a plurality of hydraulic devices including at least a first hydraulic device, a second hydraulic device, and a third hydraulic device by supplying a working fluid to each of the plurality of hydraulic devices, and includes: a plurality of pumps including at least a first pump connected to the first hydraulic device and a second pump connected to the second hydraulic device; a merge passage that is connected to the plurality of pumps and in which streams of the working fluid discharged from the plurality of pumps join together; a flow rate control valve that is connected to the merge passage and the third hydraulic device and controls a flow rate of the working fluid flowing from the merge passage to the third hydraulic device by adjusting an opening degree of the flow rate control valve according to a flow rate control signal that is input to the flow rate control valve; and a pressure compensation valve that is provided on a side of the third hydraulic device relative to a merge point at which the streams of the working fluid join together in the merge passage and maintains an upstream-downstream pressure difference of the flow rate control valve at a predetermined pressure.

According to the present invention, the pressure compensation valve and the flow rate control valve are provided on the third hydraulic device side relative to the merge point in the merge passage. Therefore, the working fluid discharged from the pumps can be brought to the third hydraulic device via the pressure compensation valve and the flow rate control valve after the streams of the working fluid join together. For example, even when the working fluid is supplied from the first pump to the first hydraulic device in order to drive the first hydraulic device and the third hydraulic device at the same time, the working fluid can be brought to the third hydraulic device at a sufficient flow rate. Thus, at the time of driving two hydraulic devices, namely, the first hydraulic device and the third hydraulic device, at the same time, the third hydraulic device can be prevented from being supplied with the working fluid at an insufficient flow rate. Similarly, at the time of driving two hydraulic devices, namely, the second hydraulic device and the third hydraulic device, at the same time, the third hydraulic device can be prevented from being supplied with the working fluid at an insufficient flow rate.

According to the present invention, since the pressure compensation valve and the flow rate control valve are provided on the third hydraulic device side relative to the merge point in the merge passage, the number of pressure compensation valves and the number of flow rate control valves can be reduced. Thus, the number of components of the hydraulic drive device can be reduced.

Advantageous Effects of Invention

With the present invention, at the time of driving two hydraulic devices at the same time, it is possible to prevent each of the hydraulic devices from being supplied with a working fluid at an insufficient flow rate.

The above object, other objects, features, and advantages of the present invention will be made clear by the following detailed explanation of preferred embodiments with reference to the attached drawings.

DESCRIPTION OF EMBODIMENTS

Hereinafter, hydraulic drive devices 1, 1A according to Embodiments 1, 2 of the present invention will be described with reference to the aforementioned drawings. Note that the concept of directions mentioned in the following description is used for the sake of explanation; the orientations, etc., of elements according to the invention are not limited to these directions. The hydraulic drive devices 1, 1A described below are merely one embodiment of the present invention. Thus, the present invention is not limited to the embodiments and may be subject to addition, deletion, and alteration within the scope of the essence of the invention.

Embodiment 1

Figure 1:
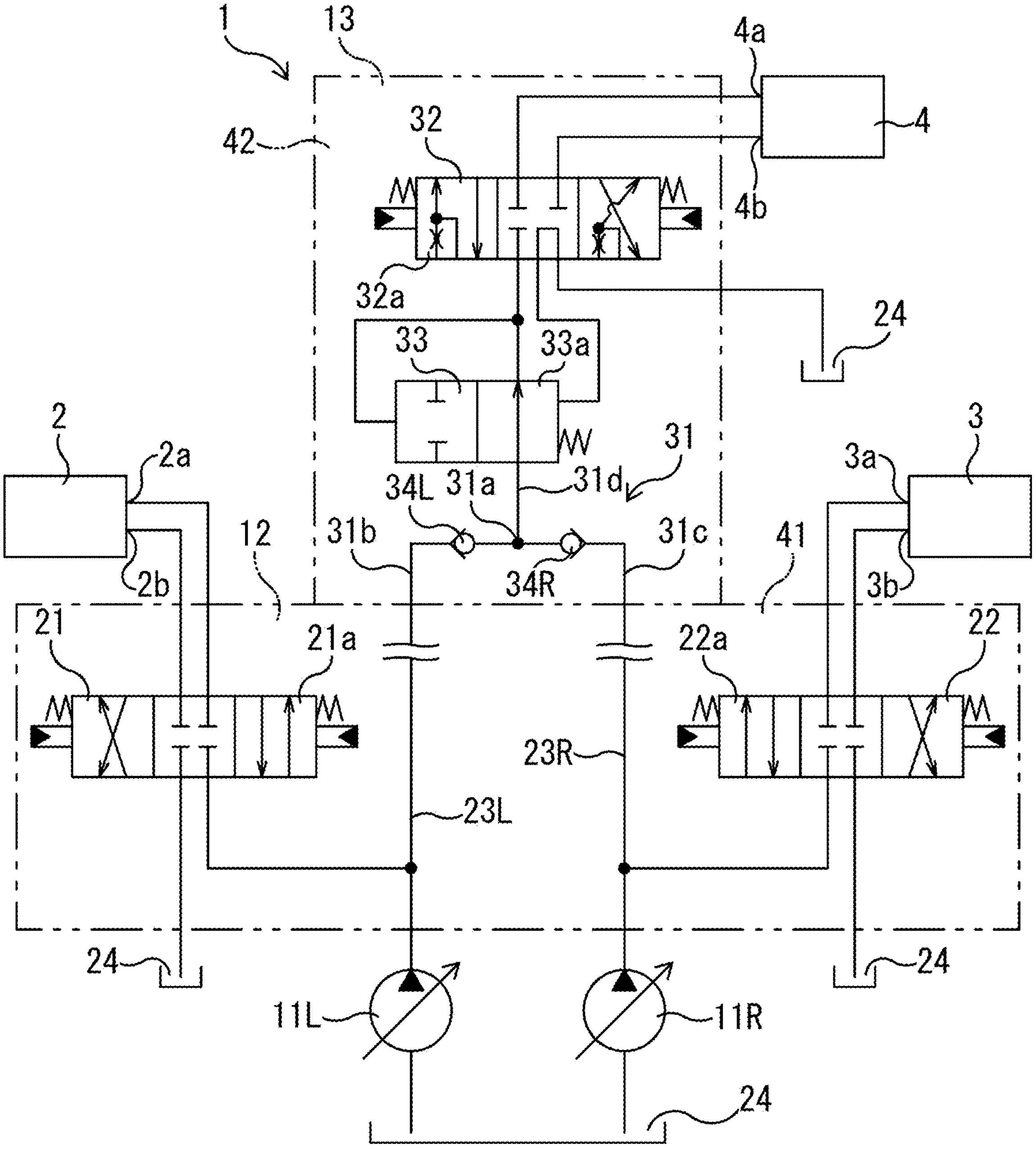
FIG. 1 is a circuit diagram illustrating a hydraulic circuit of a hydraulic drive device according to Embodiment 1 of the present invention.

The hydraulic drive device 1 illustrated in FIG. 1 is included in a vehicle or the like including a plurality of hydraulic devices (for example, a hydraulic cylinder and a hydraulic motor), examples of which include a construction vehicle such as a hydraulic excavator and an industrial vehicle such as a forklift (both of which are not illustrated in the drawings). In the present embodiment, the hydraulic drive device 1 is included in a hydraulic excavator. Note that the hydraulic drive device 1 is not limited to a vehicle or the like and may be a hydraulic robot or the like. The hydraulic excavator can perform various tasks by actuating a traveling device, a turning body, a boom, an arm, an attachment, and the like, for example. More specifically, the hydraulic excavator includes a plurality of hydraulic devices 2 to 4 including the first to third hydraulic devices 2 to 4 illustrated in FIG. 1. Each of the plurality of hydraulic devices 2 to 4 is a hydraulic cylinder or a hydraulic motor. In the present embodiment, the plurality of hydraulic devices 2 to 4 include six hydraulic devices 2 to 4 that are left and right traveling motors, a turning motor, a boom cylinder, an arm cylinder, and an attachment cylinder, for example. Note that in FIG. 1, hydraulic devices other than three hydraulic devices, namely, the first to third hydraulic devices 2 to 4, are omitted for the sake of explanation. Each of the first and second hydraulic devices 2, 3 is one of the left and right traveling motors, the turning motor, the boom cylinder, and the arm cylinder, for example. The third hydraulic device 4 is the attachment hydraulic device, for example. The attachment hydraulic device is a drill motor, a grapple cylinder, or a tilt cylinder, for example. Note that the attachment hydraulic device may be a hydraulic cylinder or motor that is used in applications other than the aforementioned motor or cylinder. The hydraulic excavator can actuate each of the traveling device, the turning body, the boom, the arm, and the attachment by supplying a working fluid (for example, oil or water) to a corresponding one of the hydraulic devices 2 to 4. This allows the hydraulic excavator to perform various tasks.

<Hydraulic Drive Device>

The hydraulic drive device 1 includes a plurality of pumps 11L, 11R, a multiple control valve block 12, and a control valve block 13. In the present embodiment, the hydraulic drive device 1 includes two pumps 11L, 11R. The hydraulic drive device 1 controls the flow of the working fluid to the plurality of hydraulic devices 2 to 4. More specifically, the hydraulic drive device 1 controls the direction and the flow rate of the working fluid flowing to the plurality of hydraulic devices 2 to 4.

<Pump>

The two pumps 11L, 11R are driven to rotate by a drive source (for example, an engine or an electric motor) not illustrated in the drawings. Thus, each of the two pumps 11L, 11R discharges the working fluid. The two pumps 11L, 11R are swash plate pumps of the variable capacity type, for example. Note that the two pumps 11L, 11R may be bent axis pumps or may be pumps of the fixed capacity type.

<Multiple Control Valve Block>

The multiple control valve block 12 includes a plurality of directional control valves 21, 22 including a first directional control valve 21 and a second directional control valve 22 illustrated in FIG. 1. Furthermore, in the multiple control valve block 12, a first pump passage 23L and a second pump passage 23R are formed. The multiple control valve block 12 is connected to the plurality of hydraulic devices 2, 3 other than the third hydraulic device 4. In other words, the multiple control valve block 12 is connected to the plurality of hydraulic devices 2, 3 including the first hydraulic device 2 and the second hydraulic device 3 illustrated in FIG. 1. The multiple control valve block 12 controls the flow of the working fluid discharged from each of the pumps 11L, 11R to the plurality of hydraulic devices 2, 3.

The first pump passage 23L is connected to the first pump 11L. The working fluid discharged from the first pump 11L flows through the first pump passage 23L. The second pump passage 23R is connected to the second pump 11R. The working fluid discharged from the second pump 11R flows through the second pump passage 23R.

The plurality of directional control valves 21, 22 are provided, at least one for every one of the plurality of hydraulic devices 2, 3. Therefore, the multiple control valve block 12 includes at least the same number of directional control valves 21, 22 as the plurality of hydraulic devices 2, 3. The plurality of directional control valves 21, 22 are connected to the corresponding hydraulic devices 2, 3. Each of the plurality of directional control valves 21, 22 is connected to one of the first pump passage 23L and the second pump passage 23R. More specifically, the plurality of directional control valves 21, 22 are connected to the pump passages 23L, 23R, respectively, in such a manner as to be in parallel with other directional control valves (not illustrated in the drawings) connected to the same pump passages 23L, 23R. Each of the plurality of directional control valves 21, 22 controls the direction and the flow rate of the working fluid flowing to a corresponding one of the hydraulic devices 2, 3. The plurality of directional control valves 21, 22 have substantially the same configurations except that each of the plurality of directional control valves 21, 22 is connected to a different one of the hydraulic devices 2, 3 and is connected to a different one of the pump passages 23L, 23R. Therefore, the following will describe the first directional control valve 21 and the second directional control valve 22 included in the plurality of directional control valves 21, 22 as an example while omitting the illustration and description of the other directional control valves.

The first directional control valve 21, which is one example of the first control valve, is provided between the first pump 11L and the first hydraulic device 2. The first directional control valve 21 controls the flow rate of the working fluid flowing from the first pump 11L to the first hydraulic device 2. The first directional control valve 21 changes the direction of the working fluid flowing from the first pump 11L to the first hydraulic device 2. More specifically, the first directional control valve 21 is a spool valve, for example, and is connected to the first pump passage 23L, a tank 24, and the first hydraulic device 2. According to an input first signal, the first directional control valve 21 changes a destination to which each of two ports 2*a*, 2*b* of the first hydraulic device 2 is to be connected, between the first pump passage 23L and the tank 24, and thereby changes the direction of the working fluid flowing to the first hydraulic device 2. Furthermore, according to the input first signal, the first directional control valve 21 changes the opening degree thereof to control the flow rate of the working fluid flowing to the first hydraulic device 2. Note that the first signal, which is output from a control device or an operation device not illustrated in the drawings, is a pressure signal such as a pilot pressure or is an electric signal. The same is true for a second signal and a flow rate control signal, which will be described below.

The second directional control valve 22, which is one example of the second control valve, is provided between the second pump 11R and the second hydraulic device 3. The second directional control valve 22 changes the direction of the working fluid flowing from the second pump 11R to the second hydraulic device 3. Furthermore, the second directional control valve 22 controls the flow rate of the working fluid flowing from the second pump 11R to the second hydraulic device 3. More specifically, the second directional control valve 22 is a spool valve, for example, and is connected to the second pump passage 23R, the tank 24, and the second hydraulic device 3. According to an input second signal, the second directional control valve 22 changes a destination to which each of two ports 3*a*, 3*b* of the second hydraulic device 3 is to be connected, between the second pump passage 23R and the tank 24, and thereby changes the direction of the working fluid flowing to the second hydraulic device 3. Furthermore, according to the input second signal, the second directional control valve 22 changes the opening degree thereof to control the flow rate of the working fluid flowing to the second hydraulic device 3.

The control valve block 13 includes a merge passage 31, a flow rate control valve 32, and a pressure compensation valve 33. Furthermore, the control valve block 13 includes a plurality of check valves (in the present embodiment, two check valves) 34L, 34R. The control valve block 13 is connected to the two pump passages 23L, 23R and the third hydraulic device 4. The control valve block 13 causes the streams of the working fluid discharged from the pumps 11L, 11R to join together and allows the working fluid to flow to the third hydraulic device 4. The control valve block 13 controls the flow of the working fluid flowing to the third hydraulic device 4.

The merge passage 31 is connected to the two pumps 11L, 11R. More specifically, the merge passage 31 is connected to the first pump passage 23L and the second pump passage 23R. The merge passage 31 is connected to the two pumps 11L, 11R via the passages 23L, 23R. The merge passage 31 causes the streams of the working fluid discharged from the two pumps 11L, 11R to join together at a merge point 31*a*. More specifically, the merge passage 31 includes a first connecting portion 31*b*, a second connecting portion 31*c*, and a merge portion 31*d*. The first connecting portion 31*b* is connected to the first pump passage 23L, and the second connecting portion 31*c* is connected to the second pump passage 23R. The merge portion 31*d* is connected to the first connecting portion 31*b* and the second connecting portion 31*c* at the merge point 31*a*. The streams of the working fluid flowing via the first connecting portion 31*b* and the second connecting portion 31*c* join together at the merge point 31*a*, and the working fluid flows into the merge portion 31*d*.

The flow rate control valve 32 is connected to the merge passage 31 and the third hydraulic device 4. More specifically, the flow rate control valve 32 is connected to the merge portion 31*d* of the merge passage 31 and is connected to the two pumps 11L, 11R via the merge passage 31. The flow rate control valve 32 controls the flow of the working fluid, the streams of which have joined together in the merge passage 31, to the third hydraulic device 4. More specifically, the flow rate control valve 32 adjusts the opening degree thereof according to an input flow rate control signal and thereby controls the flow rate of the working fluid flowing from the merge passage 31 to the third hydraulic device 4. Furthermore, the flow rate control valve 32 changes the direction of the working fluid flowing from the merge passage 31 to the third hydraulic device 4 according to the input flow rate control signal. More specifically, the flow rate control valve 32 is connected to the merge passage 31, the tank 24, and two ports 4*a*, 4*b* of the third hydraulic device 4. The flow rate control valve 32 changes a destination to which each of the two ports 4*a*, 4*b* of the third hydraulic device 4 is connected, between the merge passage 31 and the tank 24, and thereby changes the direction of the working fluid flowing to the third hydraulic device 4. Furthermore, according to the input flow rate control signal, the flow rate control valve 32 changes the opening degree thereof to control the flow rate of the working fluid flowing to the third hydraulic device 4.

The pressure compensation valve 33 is provided on the third hydraulic device 4 side relative to the merge point 31*a*. In the present embodiment, the pressure compensation valve 33 is disposed between the merge point 31*a* and the flow rate control valve 32. In other words, the pressure compensation valve 33 is interposed in the merge portion 31*d* of the merge passage 31. The pressure compensation valve 33 maintains the upstream-downstream pressure difference of the flow rate control valve 32 at a predetermined pressure. More specifically, the pressure compensation valve 33 receives the upstream-downstream pressure of the flow rate control valve 32 in opposite directions and thereby adjusts the opening degree of the merge portion 31*d* so that the upstream-downstream pressure difference of the flow rate control valve 32 becomes the predetermined pressure. Thus, the flow rate control valve 32 allows the working fluid to flow to the third hydraulic device 4 at a flow rate corresponding to the opening degree of the flow rate control valve 32 regardless of a load on the third hydraulic device 4. In other words, the flow rate control valve 32 allows the working fluid to flow to the third hydraulic device 4 at a flow rate corresponding to the input flow rate control signal.

Each of two check valves 34L, 34R is provided between a corresponding one of the two pumps 11L, 11R and the merge point 31*a* in the merge passage 31. In other words, the two check valves 34L, 34R are interposed in the first connecting portion 31*b* and the second connecting portion 31*c* of the merge passage 31. The two check valves 34L, 34R allow the working fluid to flow from the pumps 11L, 11R connected thereto to the merge point 31*a* and block the working fluid from flowing backward (specifically, from the merge point 31*a* to the pumps 11L, 11R).

<Attachment of Control Valve Block to Multiple Control Valve Block>

The control valve block 13 is configured separately from the multiple control valve block 12. The control valve block 13 is attached to the multiple control valve block 12. The attachment of the control valve block 13 to the multiple control valve block 12 will be described in further detail below.

The multiple control valve block 12 includes a first block body 41. The first pump passage 23L and the second pump passage 23R are formed in the first block body 41. The plurality of directional control valves 21, 22 include spools 21*a*, 22*a*, respectively. The plurality of directional control valves 21, 22 are formed by inserting the spools 21*a*, 22*a* through the first block body 41 so as to allow movement of the spools 21*a*, 22*a*.

The multiple control valve block 13 includes a second block body 42. The merge passage 31 is formed in the second block body 42. The flow rate control valve 32 includes a spool 32*a*. The flow rate control valve 32 is formed by inserting the spool 32*a* through the second block body 42 so as to allow movement of the spool 32*a*. The pressure compensation valve 33 likewise includes a spool 33*a*. The pressure compensation valve 33 is formed by inserting the spool 33*a* through the second block body 42 so as to allow movement of the spool 33*a*. The second block body 42 is fastened to the first block body 41 so that the merge passage 31 is in communication with the two pump passages 23L, 23R. Thus, the control valve block 13 is attached to the multiple control valve block 12.

<Operation of Hydraulic Drive Device>

In the hydraulic drive device 1, at the time of driving the first hydraulic device 2 and the third hydraulic device 4 at the same time, the first signal and the flow rate control signal are input to the first directional control valve 21 and the flow rate control valve 32, respectively. Accordingly, the first directional control valve 21 allows the working fluid discharged from the first pump 11L to be supplied to the first hydraulic device 2 in a direction corresponding to the first signal. Furthermore, according to the first signal, the first directional control valve 21 controls the flow rate of the working fluid being supplied from the first pump 11L to the first hydraulic device 2.

Figure 2:
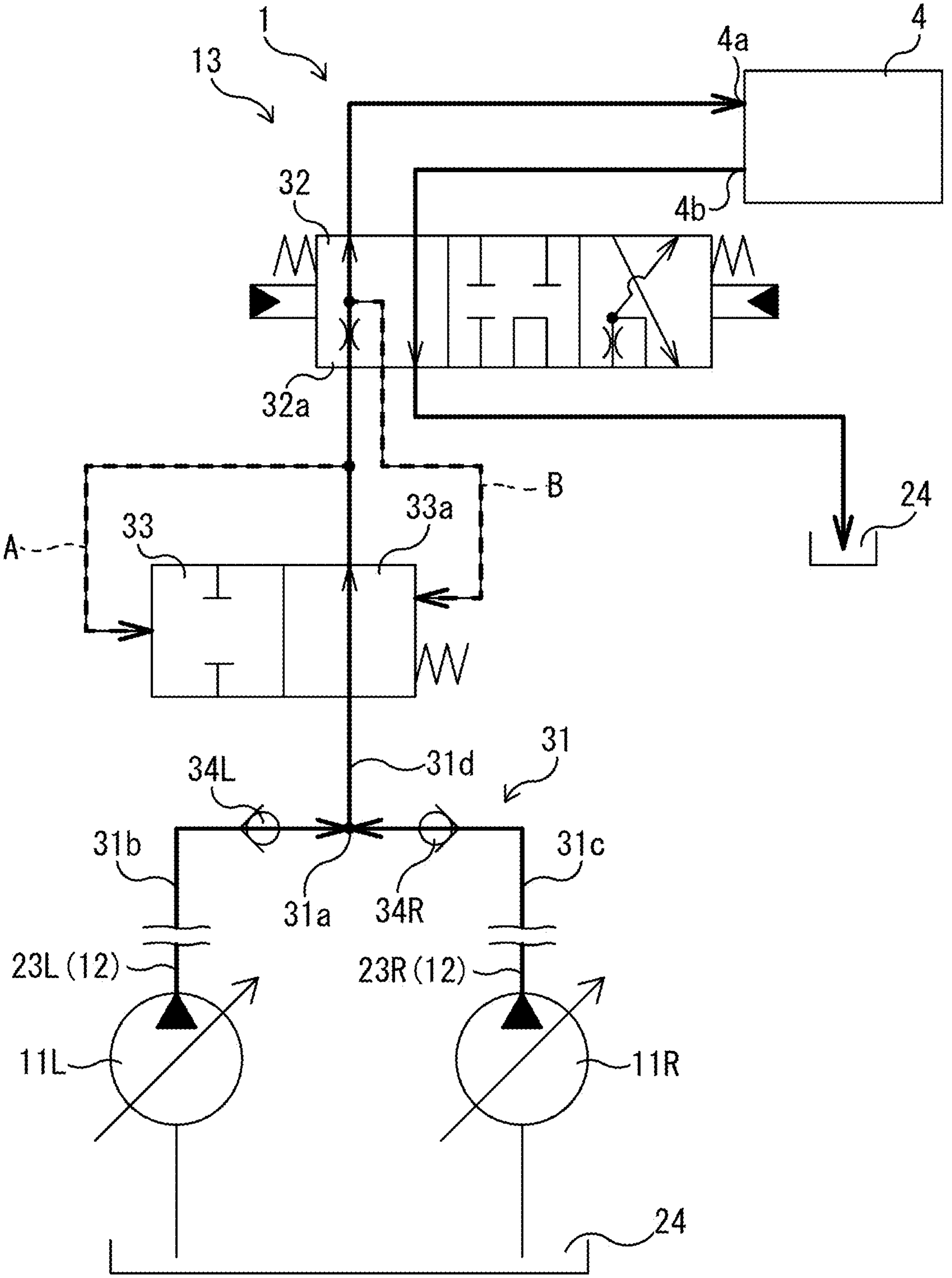
FIG. 2 is a circuit diagram illustrating the flow of a working fluid in the hydraulic circuit illustrated in FIG. 1.

The flow rate control valve 32 allows the working fluid discharged from the two pumps 11L, 11R, the streams of which have joined together in the merge passage 31, to flow to the third hydraulic device 4 in a direction corresponding to the flow rate control signal (refer to the solid line in FIG. 2). The flow rate control valve 32 allows the working fluid, the streams of which have joined together, to be supplied to the third hydraulic device 4 at a flow rate corresponding to the first flow rate control signal. More specifically, in the hydraulic drive device 1, the upstream-downstream pressure of the flow rate control valve 32 acts on the pressure compensation valve 33 in opposite directions (refer to the dotted line A and the dotted line B in FIG. 2). Thus, with the pressure compensation valve 33, the upstream-downstream pressure of the flow rate control valve 32 is maintained at the predetermined pressure. Therefore, the working fluid can flow to the third hydraulic device 4 at a flow rate corresponding to the opening degree of the flow rate control valve 32. This means that in the hydraulic drive device 1, the working fluid can flow to the third hydraulic device 4 at a flow rate corresponding to the flow rate control signal. Therefore, in the case of driving the first and third hydraulic devices 2, 4 at the same time, the hydraulic drive device 1 can drive the third hydraulic device 4 to move at a speed corresponding to the flow rate control signal regardless of a load on the third hydraulic device 4. Note that the same is true in the case of driving the second and third hydraulic devices 3, 4 at the same time and the case of driving the first to third hydraulic devices 2 to 4 at the same time. Specifically, also in these cases, the streams of the working fluid discharged from the two pumps 11L, 11R can join together in the merge passage 31, and thus the third hydraulic device 4 can be driven to move at a speed corresponding to the flow rate control signal regardless of a load on the third hydraulic device 4.

In the hydraulic drive device 1 according to the present embodiment, the pressure compensation valve 33 and the flow rate control valve 32 are provided on the third hydraulic device 4 side relative to the merge point 31*a* in the merge passage 31. Therefore, the working fluid discharged from the pumps 11L, 11R can be brought to the third hydraulic device 4 via the pressure compensation valve 33 and the flow rate control valve 32 after the streams of the working fluid join together. Thus, even in the case of supplying the working fluid from the first pump 11L to the first hydraulic device 2 in order to drive the first hydraulic device 2 and the third hydraulic device 4 at the same time, the working fluid can be brought to the third hydraulic device 4 at a sufficient flow rate. Thus, it is possible to prevent a shortage of the working fluid being supplied to the third hydraulic device 4 at the time of driving the first hydraulic device 2 and the third hydraulic device 4 at the same time. Similarly, it is also possible to prevent a shortage of the working fluid being supplied to the third hydraulic device 4 at the time of driving the second hydraulic device 3 and the third hydraulic device 4 at the same time and at the time of driving the first to third hydraulic devices 2 to 4 at the same time.

In the hydraulic drive device 1 according to the present embodiment, since the pressure compensation valve 33 and the flow rate control valve 32 are provided on the third hydraulic device 4 side relative to the merge point 31*a* in the merge passage 31, the number of pressure compensation valves 33 and the number of flow rate control valves 32 can be reduced. More specifically, it is sufficient that one pressure compensation valve 33 and one flow rate control valve 32 be disposed for the third hydraulic device 4 as in the hydraulic drive device 1 according to the present embodiment; the pressure compensation valve 33 and the flow rate control valve 32 do not need to be disposed for each of the pumps 11L, 11R. Thus, the number of components of the hydraulic drive device 1 can be reduced.

Furthermore, in the hydraulic drive device 1 according to the present embodiment, each of the check valves 34L, 34R is provided between a corresponding one of the pumps 11L, 11R and the merge point 31*a* in the merge passage 31. Therefore, it is possible to block the working fluid from flowing backward to the pumps 11L, 11R.

Furthermore, in the hydraulic drive device 1 according to the present embodiment, the control valve block 13 is separate from the multiple control valve block 12. Therefore, the control valve block 13 can be attached to the existing multiple control valve block 12 afterward. The hydraulic drive device 1 can be easily manufactured.

Embodiment 2

A hydraulic drive device 1A according to Embodiment 2 has a configuration similar to the configuration of the hydraulic drive device 1 according to Embodiment 1. Therefore, the configuration of the hydraulic drive device 1A according to Embodiment 2 will be described focusing on differences from the hydraulic drive device 1 according to Embodiment 1; elements that are the same as those of the hydraulic drive device 1 according to Embodiment 1 share the same reference signs, and as such, description of the elements will be omitted.

Figure 3:
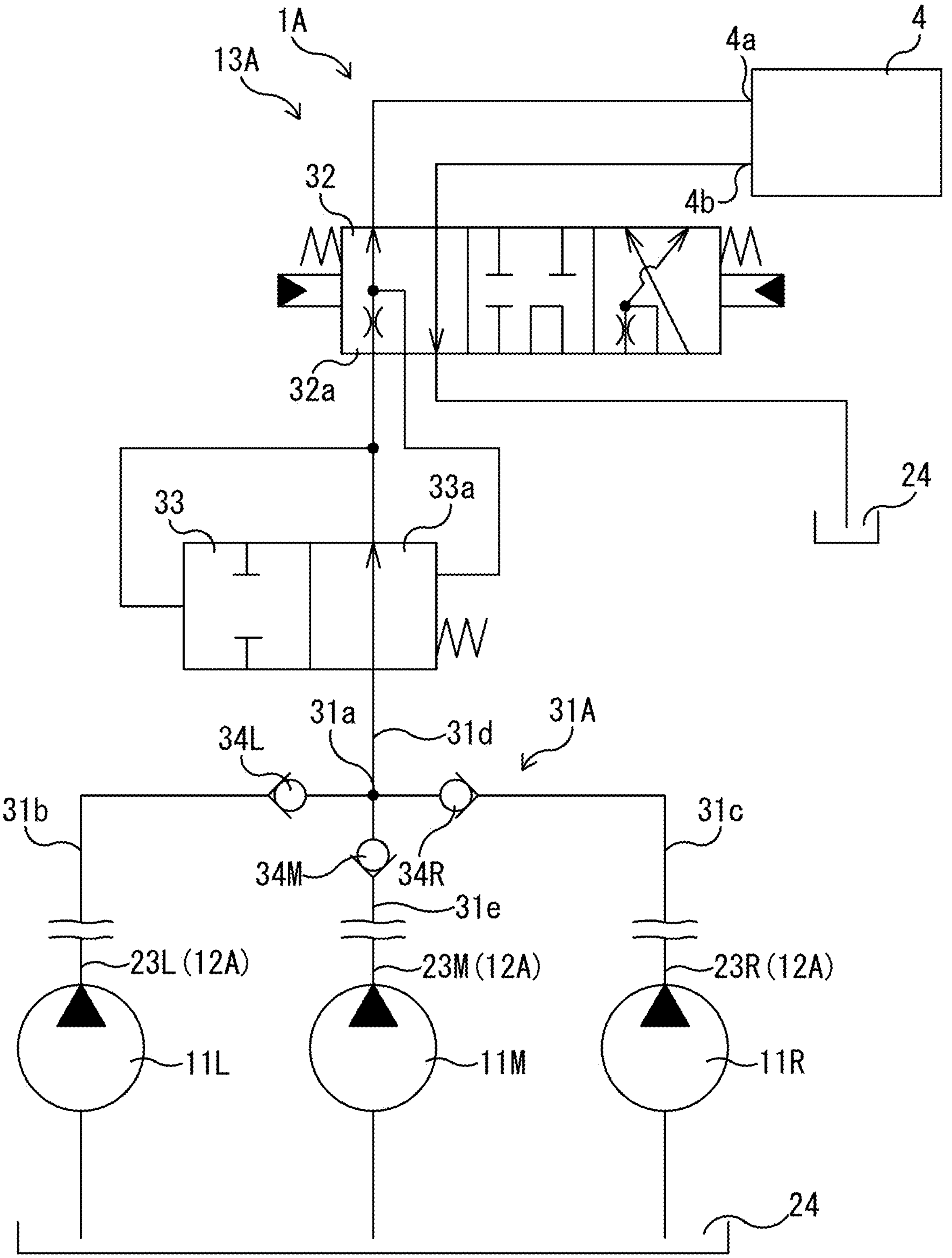
FIG. 3 is a circuit diagram illustrating a hydraulic circuit of a hydraulic drive device according to Embodiment 2 of the present invention.

The hydraulic drive device 1A according to Embodiment 2 includes three pumps 11L, 11R, 11M, a multiple control valve block 12A, and a control valve block 13A, as illustrated in FIG. 3. The third pump 11M has substantially the same configuration as the configuration of each of the first and second pumps 11L, 11R. Specifically, the third pump 11M is driven to rotate by a drive source not illustrated in the drawings and thereby discharges the working fluid. Note that the first to third pumps 11L, 11R, 11M do not necessarily need to have the same configuration.

The multiple control valve block 12A includes a plurality of directional control valves. Note that in FIG. 3, illustration of the plurality of directional control valves is omitted. Furthermore, in the multiple control valve block 12A, a third pump passage 23M is formed in addition to the first and second pump passages 23L, 23R. The third pump passage 23M is connected to the third pump 11M. Each of the plurality of directional control valves is connected to one of the first to third pump passages 23L, 23R, 23M. The plurality of directional control valves are connected to the passages 23L, 23R, 23M, respectively, in such a manner as to be in parallel with other directional control valves connected to the same passages 23L, 23R, 23M.

The control valve block 13A includes a merge passage 31A, the flow rate control valve 32, the pressure compensation valve 33, and three check valves 34L, 34R, 34M. The merge passage 31A is also connected to the third pump 11M via the third pump passage 23M. The merge passage 31A causes the streams of the working fluid discharged from the three pumps 11L, 11R, 11M to join together at the merge point 31*a*. The check valve 34M is provided between the merge point 31*a* and the third pump 11M (specifically, a third connecting portion 31*e*). The check valve 34M allows the working fluid to flow from the third pump 11M to the merge point 31*a* and blocks the working fluid from flowing backward.

The hydraulic drive device 1A according to Embodiment 2 produces substantially the same advantageous effects as those produced by the hydraulic drive device 1 according to Embodiment 1.

Other Embodiments

The hydraulic drive devices 1, 1A according to Embodiments 1, 2 may include four or more pumps and may include five or less directional control valves or include seven or more directional control valves. In the hydraulic drive devices 1, 1A according to Embodiments 1, 2, the pressure compensation valve 33 may be provided between the flow rate control valve 32 and the second hydraulic device 3. Furthermore, in the hydraulic drive devices 1, 1A according to Embodiments 1, 2, the pressure compensation valve may be provided for each of the plurality of directional control valves. Moreover, in the hydraulic drive devices 1, 1A, the plurality of directional control valves 21, 22 may be open-center spool valves that open and close the pump passages 23L, 23R.

Figure 4:
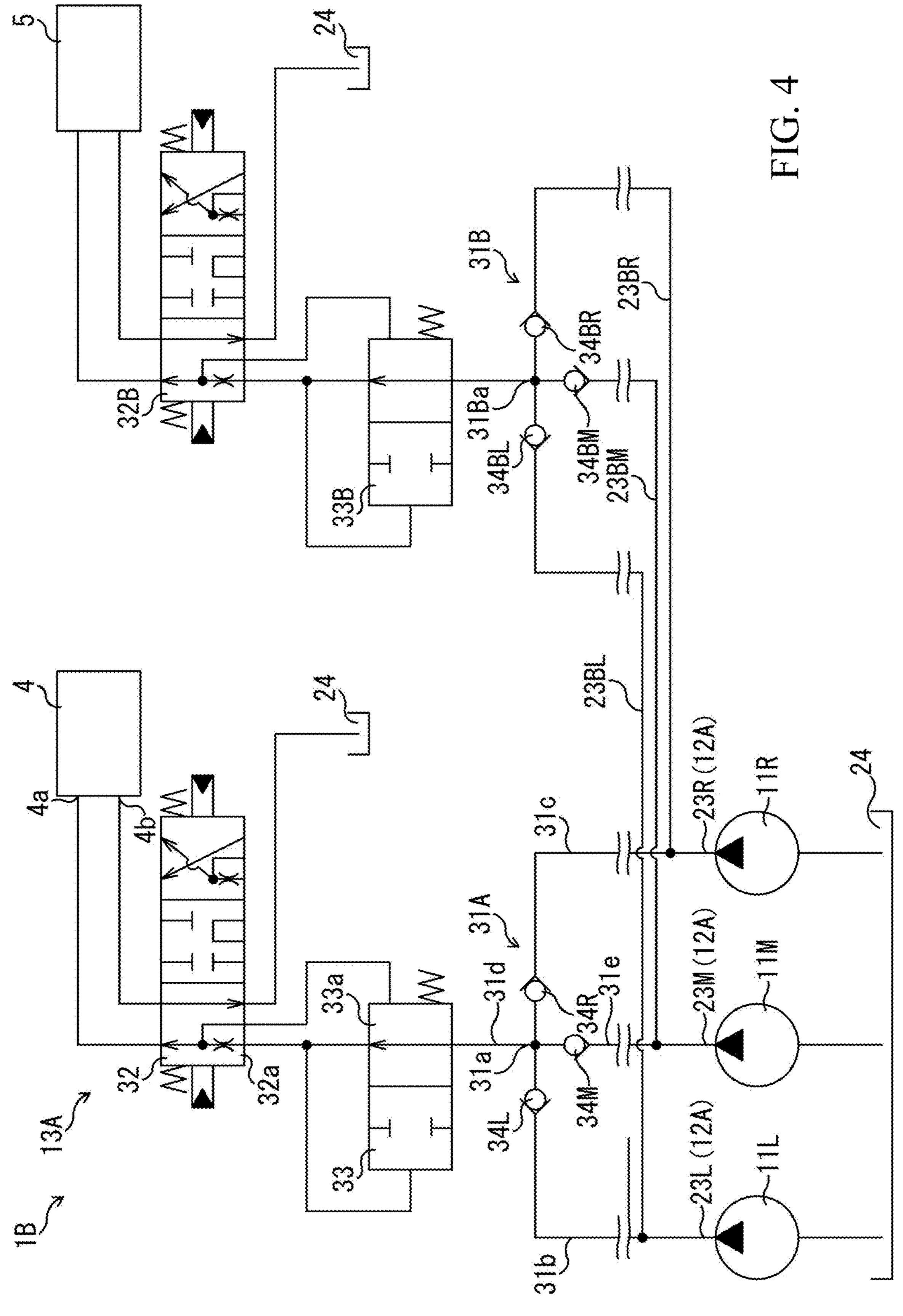
FIG. 4 is a circuit diagram illustrating a hydraulic circuit of another hydraulic drive device according to the present invention.

A hydraulic drive device 1B according to another embodiment may be configured as described below. Specifically, the pumps 11L, 11R, 11M may be connected to another hydraulic device 5 via another merge passage 31B, as illustrated in FIG. 4. Furthermore, flow rate control valve 32B and pressure compensation valve 33B, which are different from those described above, are connected to another merge passage 31B. In other words, another hydraulic device 5, another flow rate control valve 32B, and another pressure compensation valve 33B are connected to the pumps 11L, 11R, 11M in such a manner as to be in parallel with the hydraulic device 4, the flow rate control valve 32, and the pressure compression valve 33 described above. Another merge passage 31B is a passage different from the merge passage 31A described above. The other hydraulic device 5 is a hydraulic device different from the first to third hydraulic devices 2 to 4. Another flow rate control valve 32B and another pressure compensation valve 33B are valves different from the flow rate control valve 32 and the pressure compensation valve 33.

More specifically, separate pump passages 23BL, 23BR, 23BM diverge from the pump passages 23L, 23R, 23M, respectively. Check valves 34BL, 34BR, 34BM are interposed in the diverging pump passages 23BL, 23BR, 23BM, respectively. Another merge passage 31B is connected to the diverging pump passages 23BL, 23BR, 23BM. Furthermore, in another merge passage 31B, another pressure compensation valve 33B is interposed on the other hydraulic device 5 side relative to a merge point 31Ba and is connected to another hydraulic device 5 via another flow rate control valve 32B. The hydraulic drive device 1B according to another embodiment also produces substantially the same advantageous effects as those produced by the hydraulic drive devices 1, 1A according to Embodiments 1, 2.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

The invention claimed is:

1. A hydraulic drive device that drives a plurality of hydraulic devices including at least a first hydraulic device, a second hydraulic device, and a third hydraulic device by supplying a working fluid to each of the plurality of hydraulic devices, the hydraulic drive device comprising:
- a plurality of pumps including at least a first pump connected to the first hydraulic device and a second pump connected to the second hydraulic device;
- a merge passage that is connected to the plurality of pumps and in which streams of the working fluid discharged from the plurality of pumps join together;
- a flow rate control valve that is connected to the merge passage and the third hydraulic device and controls a flow rate of the working fluid flowing from the merge passage to the third hydraulic device by adjusting an opening degree of the flow rate control valve according to a flow rate control signal that is input to the flow rate control valve;
- a pressure compensation valve that is provided on a side of the third hydraulic device relative to a merge point at which the streams of the working fluid join together in the merge passage and maintains an upstream-downstream pressure difference of the flow rate control valve at a predetermined pressure; and
- a plurality of check valves each of which is provided between a corresponding one of the plurality of pumps and the merge point in the merge passage, wherein:
- each of the plurality of check valves allows the working fluid to flow from a corresponding one of the plurality of pumps to the merge point and blocks the working fluid from flowing backward.

2. The hydraulic drive device according to claim 1, further comprising:
- a multiple control valve block including a first control valve that is provided between the first pump and the first hydraulic device and controls the flow rate of the working fluid flowing from the first pump to the first hydraulic device and a second control valve that is provided between the second pump and the second hydraulic device and controls the flow rate of the working fluid flowing from the second pump to the second hydraulic device; and
- a control valve block including the merge passage, the flow rate control valve, and the pressure compensation valve, wherein:

the control valve block is separate from the multiple control valve block and is attached to the multiple control valve block.

* * * * *